3,741,922
AQUEOUS LATEX PAINT THICKENING
COMPOSITION
Ronald L. Glomski and Albert B. Savage, Midland, Mich., assignors to The Dow Chemical Company, Midland, Mich.
No Drawing. Continuation-in-part of application Ser. No. 696,984, Jan. 11, 1968, which is a continuation-in-part of application Ser. No. 484,760, Sept. 2, 1965. This application Apr. 22, 1971, Ser. No. 136,550
Int. Cl. C09d 3/80, 5/04
U.S. Cl. 260—17 R          5 Claims

ABSTRACT OF THE DISCLOSURE

This application discloses thickeners for aqueous polymer latex composition, the thickeners consisting of an intimate blend of cellulose ethers, said blend having a viscosity in 2 percent aqueous solution at 20° C. of from 1000 to 20,000 centipoises, said blend consisting of one water-soluble hydroxyalkyl alkyl cellulose ether having from 2 to 4 carbon atoms in the hydroxyalkyl group and 1 to 2 carbons in the alkyl group and having a viscosity of a 2 percent aqueous solution at 20° C. of greater than 10,000 centipoises and another water-soluble hydroxyalkyl alkyl cellulose ether having from 2 to 4 carbons in the hydroxyalkyl group and 1 to 2 carbons in the alkyl group and having a viscosity in 2 percent aqueous solution at 20° C. of less than 1000 centipoises.

---

This is a continuation-in-part of our abandoned application Ser. No. 696,984 filed Jan. 11, 1968 which was a continuation-in-part of abandoned Ser. No. 484,760 filed on Sept. 2, 1965.

This invention relates to the viscosity adjustment of aqueous latex coating compositions, such as paints. More particularly, it is concerned with a novel thickening composition useful in improving the application properties of such coating compositions.

Latex paints and other coating compositions based on the emulsion polymerizates of ethylenically unsaturated monomers have found wide acceptance in the last two decades. One of the specifications vital to acceptance of any coating composition is hiding power or the capacity to hide the substratum. Hiding power is controlled to large extent by the pigment volume concentration and by the coating thickness. The former has certain limits dictated by economics and the capacity of the pigment binding vehicle. The latter facet of coating thickness derives from the type of viscosity developed in the composition. The prior means used to increase film build, as for example, special pigments or vehicle modifications, usually generated an increase in brush drag. Thus, the type of viscosity developed has usually been a compromise between hiding power and other coating properties and the application characteristics, such as brush drag and flow and leveling of the coating composition.

Accordingly, it is the principal object of this invention to provide an improved thickening composition useful with coating compositions based on aqueous latexes.

Another object is the provision of such coating compositions having an improved spectrum of properties.

The above and related objects are achieved with a thickener composition consisting of an intimate blend of cellulose ethers, said blend having a viscosity in two weight percent aqueous solution at 20° C. of from 1000 to 20,000 centipoises and said blend consisting of one water-soluble hydroxyalkyl alkyl cellulose ether having a viscosity greater than 10,000 centipoises and a second water-soluble hydroxyalkyl alkyl cellulose ether having a viscosity less than 1000 centipoises. The objects are further realized with coating compositions based on aqueous latexes of film-forming interpolymers, the compositions containing the above-defined thickener.

The thickeners of the present invention are blends of two cellulose ethers, one having a relatively high viscosity and one having a relatively low viscosity. The most advantageous cellulose ethers are those water-soluble hydroxyalkyl alkyl cellulose ether derivatives with hydroxyalkyl groups containing from 2 to 4 carbons and with alkyl groups containing from 1 to 2 carbons. Within the advantageous class, the preferred group of cellulose ethers are the water-soluble hydroxypropyl methyl cellulose ethers especially those having from about 19 to 24 percent methoxy substitution and from about 4 to 12 percent hydroxypropoxy substitution. Such products are available commercially under the designation Methocel 90 HG in various viscosity grades. A particularly useful variety is one that is identified as a dispersible granular grade. The homologous derivatives have substitutions generally in molar proportion to the above. All of those preferred cellulose ethers have the common characteristic of a very high gelation temperature relative to all other nonpolar simple or mixed cellulose ethers.

The useful thickeners are those blends of one cellulose ether having a viscosity in 2 percent by weight aqueous solution at 20° C. of at least 10,000 centipoises with another having a viscosity less than 1000 centipoises. It is requisite to the concept of the invention that the ethers be of the divergent viscosity grades. If the ratio is any less than the indicated 10 to 1, the desirable benefits are less likely to be obtained as such ratios approach the statistically measured distribution. To achieve the objectives of the invention, it is necessary that the thickener be composed of significant proportions of each of the cellulose ethers. Most advantageously, the thickener should contain at least 25 percent of either of the cellulose ethers with the remainder of the other. When the thickener is composed of so little of one cellulose ether proportional to the other that the properties of the thickener are dictated by the one in greater proportion, the effects imparted to a coating formulation are no improvement over the ether used alone. The thickener should have a viscosity in 2 percent aqueous solution at 20° C. of between 1000 and 20,000 centipoises to attain best performance from the viewpoint of economics and application properties. When the viscosity of the thickener is greater than 20,000 centipoises, it is difficult to incorporate into the coating formulation.

The thickeners of the present invention are useful with all aqueous latexes of polymeric materials. These include typically the aqueous emulsion polymerizates of ethylenically unsaturated monomers such as styrene and other alkenyl aromatic monomers with butadiene and other open-chain aliphatic conjugated dienes containing from 4 to 9 carbon atoms, acrylic monomers including the alkyl acrylates, such as ethyl, butyl and octyl acrylate, and the alkyl alkacrylates, such as methyl methacrylate, the chloroethylenic monomers, such as vinyl chloride and vinylidene chloride, the vinyl alkanoates, as vinyl acetate and vinyl propionate. The operable latexes would include the various homopolymers and interpolymers of the above monomers with each other or with other known ethylenically unsaturated monomers. The latexes may also be blends of the emulsion polymerizates of two or more such latexes. Since the present invention is directed at the improvement in application properties while retaining good coating properties, the concept is utilizable primarily with the air-dry film-forming latexes because those are the ones most frequently used in coating compositions. However, the concept can also be used with those latexes requiring coalescing aids, elevated temperature cure, or other assists to the promotion of film formability.

Those latexes that are air-dry and film-forming require, in addition to polymer identity, that the amount of solids and particle size be within certain ranges. The thickener of the present invention, however, operates essentially independently of those parameters and thus is useful in all such latexes.

The thickeners may be incorporated into the latex or the formulated coating composition by any known means. The powder can be slurried into the liquid additives and stirred slowly into the latex or formulation or an aqueous concentrate can be prepared and incorporated into the composition. The cellulose ethers, particularly those of very high viscosity, are difficult to disperse uniformly and, consequently, should be incorporated slowly into the latex or aqueous medium while agitating.

The coating compositions will incorporate the usual formulating additives for paints and the like, in addition to the latex and the pigment. Typical of those formulating additives are various stabilizers, extender pigments, co-alescing aids, plasticizers, preservatives, such as fungicides and other known additives.

The concept of the invention will be illustrated by the following examples wherein all parts and percentages are by weight unless otherwise indicated.

EXAMPLE 1

A paint formulation was prepared from the following ingredients:

| Ingredients: | Amount (#/100 gal.) |
|---|---|
| Water | 150 |
| Daxad 30 (25%) (sodium salt of a polyelectrolyte) | 8 |
| Dowicil 100 [1-(3-chloroallyl)-3,5,7-triaza-1-azoniiadamantane chloride] | 2 |
| Ethylene glycol | 15 |
| Polypropylene glycol (average M.W.=1200) | 1 |
| Titanium dioxide, rutile | 200 |
| Calcium carbonate (finely divided) | 237 |
| One Pass Morehouse Mill. | |
| Acrylic latex [1] | 333 |
| Thickener | 200 |
| Dowfax 9N9 (nonylphenol condensed with 9 moles ethylene oxide) | 5 |

[1] The aqueous emulsion polymerizate of 67% ethyl acrylate, 33% methyl methacrylate, 1% acrylic acid, and 1% methacrylic acid (47% solids).

The cellulose ethers employed as the thickeners were hydroxypropyl methyl cellulose ethers having from 4 to 12 percent hydroxypropoxyl substitution and from 19–24 percent methoxyl substitution in the viscosity grades of 50,000 centipoises and 400 centipoises. These are indicated in the tables below as 90 HG, 50,000 and 90 HG 400 respectively. The concentration of thickener in each case is listed in the following Table I. The paints were deposited on a primed substrate using normal brush application. Three brush outs were made for each paint and the amount deposited in grams on an area two square feet noted. The value given in Table I is the average amount deposited for the three runs.

TABLE I

| 90 HG 50,000 #/100 gallon | 90 HG 400#/100 gallon | Solution concentration, percent | Paint viscosity (KU) | Deposition (g./2 ft.²) average |
|---|---|---|---|---|
| 0.00 | 6.00 | 3.0 | 85 | 15.5 |
| 0.75 | 4.50 | 2.6 | 84 | 18.1 |
| 1.50 | 3.00 | 2.3 | 82 | 16.6 |
| 2.25 | 1.50 | 1.9 | 76 | 18.5 |
| 3.00 | 0.00 | 1.5 | 79 | 13.8 |

From the table it can be seen that, although the paint viscosity of the blended products is lower than that when a single cellulose ether is employed, the amount of paint deposited is higher in each case.

EXAMPLE 2

Paint formulations were prepared using the same proportions of water and additives as indicated in Example 1. Sample F used the acrylic latex of Example 1, Sample G used a film-forming styrene/butadiene latex, and Sample H employed 284.6 parts of a polyvinyl acetate latex. Two hundred parts of thickener solution were employed in each case. Five parts of the wetting agent listed in Table I employed and to the polyvinyl acetate sample there was added an additional 48.4 parts of water. The results of the paint deposition tests noted in Example 1 are shown in Table II. In that table the designation 90 HG 4000 DGS refers to a hydroxypropyl methyl cellulose having a viscosity of 4000 centipoises in 2 percent aqueous solution at 20° C. in a dispersible granular grade. The designation Blend A refers to a blend of 36 percent of 90 HG 50,000 (as defined in Example 1), and 64 percent 90 HG 400 (as defined in Example 1). The designation Blend B refers to a blend of 65.7 percent 90 Hg 50,000 and 34.3 percent 90 HG 400. All of the ethers employed were a dispersible granular grade (identified as DGS).

TABLE II

| | Formulation F (acrylic) | |
|---|---|---|
| Thickener | Paint viscosity KU | Average |
| 90 HG 4,000 DGS | 88 | 14.7 |
| Blend A | 86 | 17.6 |
| Blend B | 85 | 17.9 |
| | Formulation G (styrene/butadiene) | |
| 90 HG 4,000 DGS | 83 | 14.1 |
| Blend A | 78 | 16.7 |
| Blend B | 83 | 17.7 |
| | Formulation H (PVAc) | |
| 90 HG 4,000 DGS | 86 | 15.1 |
| Blend A | 82 | 18.3 |
| Blend B | 86 | 18.8 |

The results indicate that the thickener of this invention is operable with latexes of various polymer identities.

When blends consisting of the 50,000 centipoise cellulose ether employed in the examples blended with 400 centipoises methyl cellulose or with a 400 centipoise cellulose ether having from 27 to 29 percent methoxyl and 5.5 to 7.5 hydroxypropoxyl were used, there was a suitable viscosity adjustment but other undesirable effects on the paint properties.

When blends were made employing hydroxyethyl cellulose, there was no combination of cellulose ethers that provided the desired property. Thus, the specified cellulose ethers in the expressed ratios solve the problem of increased paint build while improving the application properties of those paints.

What is claimed is:

1. An aqueous latex paint composition comprising (1) an aqueous latex of a film-forming addition copolymer of an alkenyl aromatic monomer with an open chain aliphatic conjugated diene containing from 4 to 9 carbon atoms, or the homopolymers of an alkyl acrylate wherein the alkyl group contains from 1–8 carbon atoms, methyl methacrylate, vinyl chloride or vinylidene chloride of the interpolymers thereof, (2) a pigment, and (3) a thickener consisting of an intimate blend of cellulose ethers, said blend having a viscosity in 2 percent aqueous solution at 20° C. of from 1000 to 20,000 centipoises, said blend consisting of one water-soluble hydroxyalkyl alkyl cellulose ether having from 2 to 4 carbon atoms in the hydroxyalkyl group and 1 to 2 carbons in the alkyl group and having a viscosity of a 2 percent aqueous solution at 20° C. of greater than 10,000 centipoises and another water-soluble hydroxyalkyl alkyl cellulose ether having from 2 to 4 carbons in the hydroxyalkyl group and 1 to 2 carbons in the alkyl group and having a viscosity in 2 percent aqueous solution at 20° C. of less than 1000 centipoises, wherein said thickener contains at least 25 percent of either of the cellulose ethers with the remainder of the other.

2. The paint composition of claim 1 wherein said polymer is a film-forming copolymer of styrene and butadiene.

3. The paint composition of claim 1 wherein said polymer is polyvinyl acetate.

4. The paint composition of claim 1 wherein the cellulose ethers in each case are hydroxypropyl methyl cellulose ethers having from 19 to 24 percent methoxy and 4 to 12 percent hydroxypropoxyl and are present in a ratio of from 1 to 1.9 parts of high viscosity to 1.8 to 1 parts of low viscosity cellulose ethers.

5. The paint composition of claim 1 wherein the high viscosity cellulose ether has a viscosity of 50,000 centipoises and the other cellulose ether has a viscosity of 400 centipoises.

References Cited
UNITED STATES PATENTS

| | | | |
|---|---|---|---|
| 3,014,808 | 12/1961 | Nyberg | 260—17 R X |
| 3,093,603 | 6/1963 | Gilchrist | 260—17 R |

WILLIAM H. SHORT, Primary Examiner

L. M. PHYNES, Assistant Examiner

U.S. Cl. X.R.

260—29.6 R, 29.7 R, 41 B